United States Patent
Geisel

(10) Patent No.: US 8,379,194 B2
(45) Date of Patent: Feb. 19, 2013

(54) METHOD AND DEVICE FOR AUTOMATIC LASER FOCUSING

(75) Inventor: Mark Geisel, Gauting (DE)

(73) Assignee: MTU Aero Engines GmbH, Munich (DE)

( * ) Notice: Subject to any disclaimer, the term of this patent is extended or adjusted under 35 U.S.C. 154(b) by 133 days.

(21) Appl. No.: 12/919,456

(22) PCT Filed: Feb. 18, 2009

(86) PCT No.: PCT/DE2009/000226
§ 371 (c)(1),
(2), (4) Date: Aug. 25, 2010

(87) PCT Pub. No.: WO2009/106043
PCT Pub. Date: Sep. 3, 2009

(65) Prior Publication Data
US 2011/0007304 A1    Jan. 13, 2011

(30) Foreign Application Priority Data
Feb. 25, 2008 (DE) .......................... 10 2008 010 981

(51) Int. Cl.
*G01J 1/00* (2006.01)
(52) U.S. Cl. ........................................................ 356/123
(58) Field of Classification Search ............... 250/201.1, 250/201.2, 201.4; 372/9, 24, 29.01, 29.011, 372/38.01, 38.02
See application file for complete search history.

(56) References Cited

U.S. PATENT DOCUMENTS

| | | | |
|---|---|---|---|
| 5,948,292 A | 9/1999 | Tanaka et al. | |
| 6,867,508 B2 * | 3/2005 | Tamaishi et al. | 257/798 |
| 2005/0082264 A1 * | 4/2005 | Nagai et al. | 219/121.62 |

FOREIGN PATENT DOCUMENTS

| | | |
|---|---|---|
| DE | 195 20 213 A1 | 12/1995 |
| DE | 102 48 458 A1 | 5/2004 |
| DE | 102 55 628 A1 | 7/2004 |
| DE | 103 29 744 A1 | 9/2004 |
| JP | 11 156578 A | 6/1999 |
| JP | 2007 237200 A | 9/2007 |

OTHER PUBLICATIONS

International Search Report, PCT/DE2009/000226, Jun. 29, 2009.
German Search Report, 10 2008 010 981.1, Sep. 13, 2008.

* cited by examiner

*Primary Examiner* — Gregory J Toatley
*Assistant Examiner* — Shawn Decenzo
(74) *Attorney, Agent, or Firm* — Howison & Arnott, L.L.P.

(57) ABSTRACT

The invention relates to a process and an apparatus for automatic laser focusing. The core concept of the process is the automatable and especially preferably the automated photographing of the focal spot generated during a focus series by camera and a determination of the particular focal spot diameter as well as an evaluation of this data by an interpolated or approximating function that allows a conclusion about the focal spot with the smallest focal spot diameter and thus with the associated optimal focal distance. A series of disadvantages present in the state of the art can be avoided by using the process in accordance with the invention, in particular the great expenditure of time in the determining of the optimal focal distance and the uncertainty in the selection of the optimal focal spot associated with an operator are eliminated in the framework of the photographing of a focus series.

10 Claims, 2 Drawing Sheets

METHOD AND DEVICE FOR AUTOMATIC LASER FOCUSING

CROSS-REFERENCE TO RELATED APPLICATIONS

This application is a U.S. National Phase application submitted under 35 U.S.C. §371 of Patent Cooperation Treaty application serial no. PCT/DE2009/000226, filed Feb. 18, 2009, and entitled METHOD AND DEVICE FOR AUTOMATIC LASER FOCUSING, which application claims priority to German patent application Ser. No. 10 2008 010 981.9, filed Feb. 25, 2008, and entitled VERFAHREN UND VORRICHTUNG ZUR AUTOMATISCHEN LASERFOKUSSIERUNG.

Patent Cooperation Treaty application serial no. PCT/DE2009/000226, published as WO 2009/106043, and German patent application Ser. No. 10 2008 010 981.9, are incorporated herein by reference.

TECHNICAL FIELD

The invention relates to a process and an apparatus for automatic laser focusing.

BACKGROUND

Lasers are used today for processing a plurality of technical materials such as, e.g., metals, plastics and also ceramics. The material to be processed melts or evaporates due to the high energy, which is concentrated in a very small focal spot and is made available in the form of light which is normally coherent and monochromatic. The fact that the laser beam as such is not subject to any wear and that a direct material contact between tool and workpiece is eliminated is especially advantageous in the use of lasers as tools.

In order to obtain the best possible processing result, it is necessary that the laser beam is optimally focused on the workpiece to be processed. Otherwise, the spread light energy is distributed onto too great an area, so that the temperatures achieved in the irradiation are possibly insufficient for an effective processing. Moreover, it is frequently desirable that the area processed by the tool and in the form of a cut edge turns out to be as narrow as possible, which is also achieved by an optimally focused laser beam.

In order to adjust the smallest possible focal spot the lenses present in laser systems have appropriate adjustment possibilities for the focal distance. Even though these lenses can possibly also be actuated automatically, it is nevertheless necessary to perform the desired adjustment of the focal distance manually to the extent that the result is sought from a series of tests with different settings of the lens at which result the focal spot is the smallest. The parameters belonging to this result are subsequently passed on to the lens of the laser system.

To this end a plurality of tests with different focusing adjustments is usually carried out. Such a test series is also called a focus series. The evaluation of the results take place manually by an operator. Since the focal spots to be examined are frequently very small by nature, this examination takes place in the normal case with the additional aid of auxiliary optical means such as, for example, magnifying glasses or microscopes.

This manner of procedure entails a number of disadvantages. At first, the quality of the results is a function of the experience of the operator who carries out the examination and the selection of the optimal focal spot. Furthermore, the carrying out of the tests and the subsequent evaluation are time-consuming. It can occur in particular in the case of workpiece forms that frequently change and for which a new determination of the optimal focal distance is required every time, that the particular preparation lasts longer than the actual processing of the workpiece. Furthermore, the selection of the optimal focal spot often proves to be difficult since the changes of the focal spot in the vicinity of the optimum are normally only small and can be recognized only with difficulty with the human eye. In order to nevertheless achieve an optimal processing result, it is necessary to reliably determine even extremely small changes in order to find the optimal parameters and pass them on to the laser lens. In particular, it can occur that the quality of a focal spot deteriorates only because, for example, the material located under it has an inhomogeneity although the change of the focal distance should actually have had the result of improving the quality of the focal spot. It can occur in such instances that only a local but not, however, a global minimum of the focal spot diameter is found and that the corresponding sub-optimal parameters are used in the later processing.

The problem of the invention is accordingly to make available a process and an apparatus for avoiding the disadvantages present in the state of the art, in particular the great expenditure of time in the determining of the optimal focal distance and the uncertainty in the selection of the optimal focal spot associated with an operator.

SUMMARY

The problem is addressed by the features of the process disclosed and claimed herein as well as by the features of the apparatus according to claim 7. Accordingly, a process is made available that makes possible a fully automatic carrying out of all steps necessary for determining the optimal focal distance.

Further preferred embodiments can be gathered from the dependent claims and the following detailed description and the figures.

The process in accordance with the invention serves for an automatic focusing in order to avoid in this manner the above-described disadvantages known from the state of the art.

The core concept of the process is the automatable and especially preferably the automated photographing of the focal spot generated during a focus series by camera and a determination of the particular focal spot diameter as well as an evaluation of this data by an interpolated or approximating function that allows a conclusion about the focal spot with the smallest focal spot diameter and thus with the associated optimal focal distance.

Accordingly, the process in accordance with the invention for the automatic laser focusing for the obtention of a smallest possible focal spot in the laser processing comprises the following steps at first:

(a) Adjusting of the focal distance f of a laser to a starting value A;
(b) Resetting a continuous index i;
(c) Producing a focal spot on a workpiece to be processed;
(d) Storing the particular continuous index i together with the particular value of the focal distance $f_i$;
(e) Moving the workpiece by one path increment $\Delta x$ along a predetermined track;
(f) Adjusting the focal distance f in the direction of a final value B by one infeed increment $\Delta f$;
(g) Repetition of the steps (c) to (f) under successive raising of the continuous index i until reaching a previously determined number $i_{max}$ of focal spots 2 or until reaching the final value B or until reaching the end of the predetermined track 4;

(h) Searching for the focal spot with the smallest focal spot diameter $d_{opt}$;

(i) Determining the optimal continuous index $i_{opt}$ belonging to this focal spot;

(j) Adjusting the optimal focal distance $f_{opt}$ belonging to this continuous index $i_{opt}$.

The adjusting of focal distance f can take place manually or preferably automatically. An automatic adjustability has the advantage that it is more rapid and more reliable than is possible with a manual actuation.

Continuous index i begins, for example, at 1 and is incrementally raised by 1 when passing through appropriate loops.

A computer is preferably used to store the obtained data such as of continuous index i and of focal distance $f_i$; however it is alternatively also possible to note the data in an appropriate manual manner.

The workpiece on which the focus series is carried out is preferably moved. However, according to an alternative embodiment even the laser can be moved, or laser and workpiece can be moved relative to one another. The previously determined track can be a stretch with a straight, bent or angular form or some other form. It can have a separate starting point and end point or alternatively a common (superposed) starting point and end point such as, for example, in the case of a circle.

The starting value and the end value A respectively B are preferably selected in such a manner that they cover a logical range as regards the focal distance. That means that focal distances that are distanced unnecessarily far from the expected optimum should be excluded at the beginning in order to avoid unnecessarily long focus series.

Path increment $\Delta x$ is preferably dimensioned in such a manner that on the one hand the particular focal spots produced are not located too close to each other and on the other hand the length of the predetermined track is minimized.

Even infeed increment $\Delta f$ should be dimensioned in such a manner that the variations to be expected between the individual focal spot diameters do not turn out to be too great since otherwise the finding of the optimal focal distance will be possible only to a limited extent.

The production of focal spots is preferably stopped in accordance with the invention when a previously determined number $i_{max}$ of focal spots has been produced. Alternatively, the production can also be stopped when the end value B, that represents the limits of the focal distance to be adjusted, has been reached or exceeded. Finally, the production can also be stopped in accordance with the invention when the end of the previously determined track has been reached, since the focal spots could otherwise possibly overlap or could at least have too small a distance from each other.

The searching for the focal spot with the smallest focal spot diameter $d_{opt}$ is carried out manually, possibly with the aid of appropriate auxiliary optical means, according to an embodiment.

The optimal focal distance $f_{opt}$ belonging to the focal spot with the smallest focal spot diameter has therefore been found and can now be adjusted on the appropriate laser lens.

According to the invention the searching for the focal spot with the smallest focal spot diameter $d_{opt}$ and the determining of the associated optimal continuous index $i_{opt}$ take place as follows, during which the particular focal spot positions ($pos_i$) must have been previously stored:

After completion of the focus series, at first the counting index i is reset.

Subsequently, the particular stored focal spot positions $pos_i$ are started.

The particular focal spot diameter $d_i$ is determined and stored.

Now, even all following stored focal spot positions $pos_i$ are started under successive raising of continuous index i and their particular focal spot diameters determined until finally the previously determined number $i_{max}$ of focal spot positions $pos_i$ has been reached and the particular focal spot diameter $d_i$ has been determined.

In a next step an interpolating or approximating function is determined that reproduces the focal spot diameter $d_i$ as a function of continuous index i.

A graphic or computer-supported analysis of the course of this interpolating function can now determine its minimum. At the same time this position characterizes the number of the focal spot that has the sought minimal focal spot diameter. For the frequent case that the minimum of the interpolating function does not exactly coincide with a determined focal spot, that focal spot is then selected that is the closest to the determined minimum of the interpolating or approximating function.

Likewise, even the continuous index $i_{opt}$ closest to the minimum is now known.

In a last step even the optimal focal distance $f_{opt}$ can be determined with these associations that was previously stored together with the continuous index. The latter can be subsequently transferred to the laser system or to its focusing lens for adjusting the optimal and sought focal distance.

In analogy with the above procedure, even arrangements between two support positions can of course be determined with the aid of the interpolating or approximating function.

According to a preferred embodiment of the process of the invention it is characterized in that the determination of the particular focal spot diameter, of the interpolating or approximating function, its minimum, of the associated continuous index, of the associated focal spot does not take place after the conclusion of the production of the focus series but rather takes place continuously following the production of each individual focal spot. In such an instance it should be generally assumed that the form of the interpolating or approximating function still changes as the number of data records increases; however, this change turns out to be smaller if the number of support positions is high and the mathematical type of the interpolating or approximating function is known in advance.

According to an especially preferred form of the process of the invention the search for the minimal focal spot diameter $d_{opt}$ is broken off as soon as the continuous evaluation of the interpolating or approximating function and/or a comparison of the previously determined focal spot diameters among each other allow(s) values that are rising or rising again for following focal spot diameters $d_i$ to be expected. In other words, if it is to be assumed that the minimum has either been found already or, however, will lie outside of the searched range, then it is appropriate to end the production of the particular focal spots. This results in the advantage that the focus series possibly does not have to be carried out until its previously determined end but rather it can be broken off beforehand in order to save time and material in this manner and, if necessary, to perform an adaptation of the parameters of the focus series (e.g., start value and/or end value) in order to then repeat the focus series.

The continuous evaluation of the interpolating or approximating function in accordance with the invention and/or the comparison of the previously determined focal spot diameters with each other can take place manually according to one embodiment but automatically according to a preferred embodiment.

According to another embodiment of the process of the invention the determination of the particular focal spot diameter takes place with a digital camera and optionally with the aid of robust algorithms. A CCD camera is especially preferably used as digital camera. The said robust algorithms are used for the purpose of working up the photographs, that are often difficult for a human observer to evaluate, in order to simplify the corresponding evaluation.

According to an especially preferred form of the process of the invention the interpolating function has the mathematical form $y=k \cdot (1+(x-a)^2)^{1/2}$, in which y is the value of the focal spot diameter $d_i$ and x is the value for the continuous index i and k and a are both constants. Examinations have shown that a function of the described form is basically very well suited for describing the changes of the focal spot as a function of the focal distance.

Of course, according to other alternative embodiments even other interpolating functions are conceivable such as, for example, Fourier interpolation, spline interpolation, trigonometric interpolation and the like. Of course, the same also holds true for the corresponding approximating functional variants.

The invention furthermore makes an apparatus available for the automatic laser focusing for the achieving of the smallest possible focal spot in the laser processing of a workpiece. This apparatus comprises at least the following components:
- a tool laser,
- a device for adjusting the focus position,
- a tensioning device for tensioning the workpiece,
- a moving device for changing the relative position of workpiece and tool laser,
- a photographing device for photographing the image data of focal spots,
- a storage- and arithmetic unit for storing the photographed image data and its mathematical analysis,
- a device for the data transmission of the analysis results to the apparatus for adjusting the focus position.

The tool laser can be, for example, a diode laser, a fiber laser or another solid-state laser or gas laser.

The device for adjusting the focus position can be designed to be operated manually or also automatically. As an alternative to an adjusting of the focus position by changing an appropriate lens, the relative distance between the tool and the workpiece can also be changeable, in which case both the tool laser and/or the workpiece can be designed to be moveable.

Either the workpiece, the tool laser or both apparatuses can be moved in common relative to one another by the moving device for changing the relative position of workpiece and tool laser.

The photographing device for photographing the image data of focal spots is preferably a digitally operating photographing device.

A commercial PC is preferably used as storage- and arithmetic unit for storing the photographed image data and their mathematical analysis.

According to an especially preferred embodiment of the apparatus of the invention it is characterized in that the photographing device is a CCD camera.

According to another especially preferred embodiment the apparatus according to the invention comprises a device for adjusting the focus position that is automatically adjustable. In this manner the adjustment of the focal distance that is necessary for carrying out the process in accordance with the invention can take place fully automatically and without input from an operator.

BRIEF DESCRIPTION OF THE DRAWINGS

Aspects of the invention are further described in the following using a preferred embodiment together with the attached figures.

DETAILED DESCRIPTION

Figure 1:
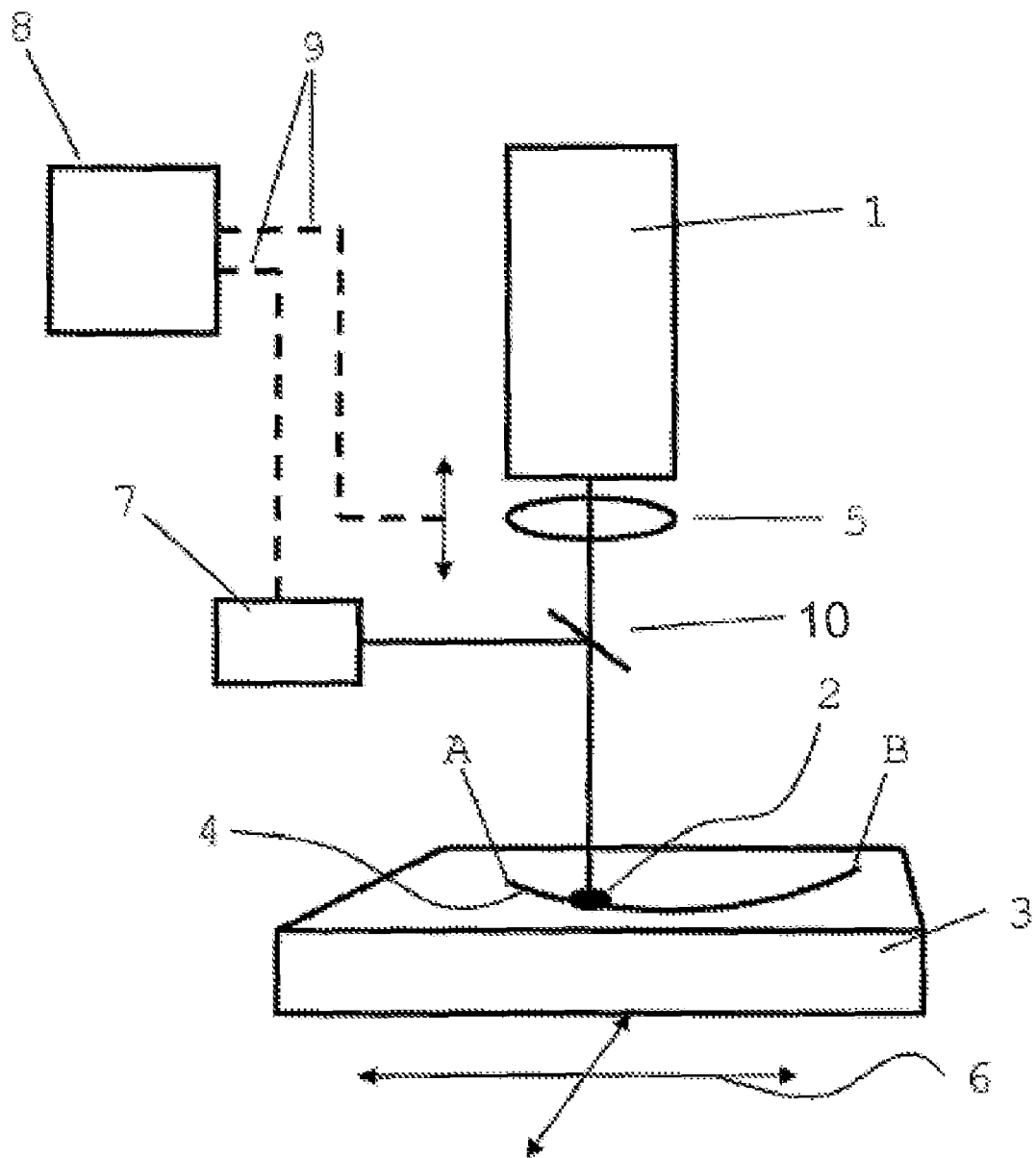
FIG. 1 shows a preferred embodiment of the apparatus in accordance with the invention.

FIG. 1 shows a preferred embodiment of the apparatus in accordance with the invention. Tool laser 1 is arranged above the workpiece 3. In the embodiment shown the distance between tool laser 1 and workpiece 3 is firmly adjusted. In order to change the focal distance a device for adjusting the focus position 5, for example in the form of an optical lens instrument, is provided in accordance with the invention. The possibility for adjustment is indicated in FIG. 1 by the small vertically standing double arrow. A focal spot 2 is produced where the laser beam contacts workpiece 3. Workpiece 3 can be moved by a moving device 6 in the embodiment shown in such a manner that the laser beam travels along a pre-determined track 4. This pre-determined track 4 has a starting value A and an end value B.

Furthermore, the apparatus in accordance with the invention comprises a photographing device 7 for photographing the focal spots produced by the tool laser. In the variant shown a mirror 10 indicated by a diagonal line is located in the beam path, which mirror deflects a part of the light reflected from focal spot 2 and supplies it to photographing device 7. This makes it possible to make a photograph of focal spot 2 directly after its production without having to move back to this position at a later point in time for a time-delayed photograph. The image data photographed by photographing device 7 is transmitted via an apparatus for data transmission 9 to a storage- and arithmetic unit 8. The storage of the photographed data as well as the analysis of this data takes place in this storage- and arithmetic unit 8. After the completion of the analysis the result is passed on in the form of an adjustment value via the apparatus for data transmission 9 to the device for adjusting the focus position 5. The photographing of the image data and the analysis of this data can take place either in a time-delayed manner, that is, after the completion of a complete focus series, or preferably isochronously, directly after the production of each individual focal spot 2.

Figure 2:
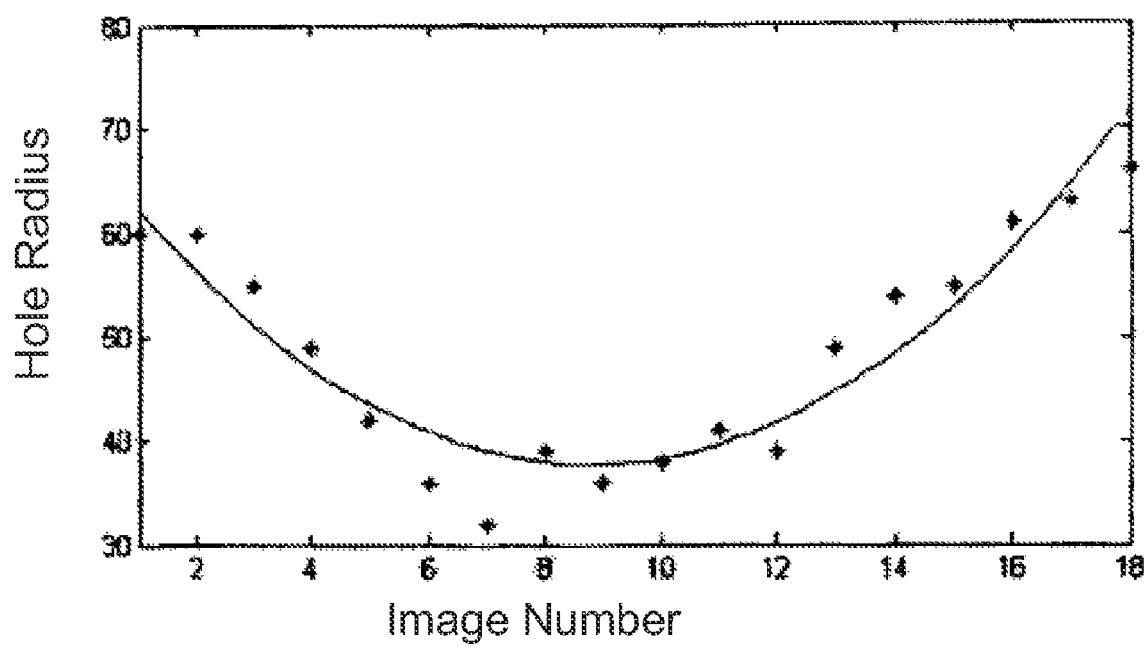
FIG. 2 shows an exemplary focus series.

FIG. 2 shows by way of example the result of a focus series. The number of the particular image of a focal spot is recorded on the x axis and the particular hole radius produced is recorded on the y axis. The discrete measured values are marked by corresponding asterisks. As can be recognized from the position of the asterisks, the hole radius decreases at first as the image number rises up to image number 7. Subsequently, the hole radius rises again in order to then slightly drop once more (image number 10). An unexpected slight drop of the hole radius can also be recognized at image number 12. Moreover, the curve of an approximating function is shown in the diagram that approximates the shown measured points as well as possible. The curve minimum is approximately at image number 9 and not, as the discrete measured values allow one to expect, at image number 7. Accordingly, the correct focal distance found by the process in accordance with the invention is the one belonging to the focal spot with the image number 9. This value can now be transmitted by the apparatus for data transmission 9 in accordance with the invention to the device for adjusting the focus position 5.

The invention claimed is:

1. A method for focusing a laser in the laser processing of a workpiece, the method comprising the following steps:
    (a) adjusting the focal distance f of a laser to a starting value A;
    (b) resetting a continuous index i to an initial value;
    (c) producing a focal spot on a workpiece to be processed;
    (d) storing the current value of the continuous index i together with the corresponding value of the focal distance $f_i$ and the corresponding value of the focal spot position $pos_i$;
    (e) moving the workpiece by one path increment $\Delta x$ along a predetermined track;
    (f) adjusting the focal distance f in the direction of a final value B by one infeed increment $\Delta f$;
    (g) incrementing the continuous index i and repeating the steps (c) to (f) until reaching one of
        (i) a previously determined number $i_{max}$ of focal spots;
        (ii) the final value B; and
        (iii) the end of the predetermined track;
    (h) determining the focal spot with the smallest focal spot diameter $d_{opt}$;
    (i) determining the optimal continuous index $i_{opt}$ belonging to the focal spot having smallest focal spot diameter $d_{opt}$; and
    (j) adjusting the focus of the laser to the optimal focal distance $f_{opt}$ belonging to the optimal continuous index $i_{opt}$;
    wherein the steps of determining the focal spot with the smallest focal spot diameter $d_{opt}$ and of determining the associated continuous index $i_{opt}$ comprise the following sub-steps
        (1) resetting the continuous index i to the initial value;
        (2) examining the particular value of the stored focal spot position $pos_i$;
        (3) determining and storing the particular focal spot diameter $d_i$ corresponding to the stored focal spot position $pos_i$;
        (4) incrementing the continuous index i and repeating the sub-steps (2) to (4) until reaching the previously determined number $i_{max}$ of focal spot positions $pos_i$;
        (5) determining an interpolating or approximating function that reproduces the focal spot diameter $d_i$ as a function of the continuous index i;
        (6) determining the minimum of the interpolating or approximating function;
        (7) determining the continuous index $i_{opt}$ located closest to the minimum of the interpolating or approximating function.

2. A method in accordance with claim 1, wherein the steps of determining the focal spot with the smallest focal spot diameter $d_{opt}$ and of determining the associated continuous index $i_{opt}$ further comprises association of the continuous index $i_{opt}$ to the corresponding focal spot.

3. A method in accordance with claim 2, wherein the determination of the particular focal spot diameter $d_i$ according to sub-step (3), of the interpolating or approximating function according to sub-step (5), of the minimum according to sub-step (6), of the associated continuous index $i_{opt}$ according to sub-step (7) and of the associated focal spot according to sub-step (8) does not occur after the conclusion of step (g) and of sub-step (4), but rather takes place continuously at each passage through sub-step (4) following this step.

4. A method in accordance with claim 3, characterized in that the search for the minimal focal spot diameter $d_{opt}$ is terminated as soon as the continuous evaluation of the interpolating or approximating function and/or a comparison of the previously determined focal spot diameters $d_i$ among each other allow(s) values that are rising or rising again for following focal spot diameters $d_i$ to be expected.

5. A method in accordance with claim 1, wherein the determination of the particular focal spot diameter takes place with a digital camera.

6. A method in accordance with claim 1, wherein the interpolating or approximating function has the mathematical form $y = k \cdot (1+(x-a)^2)^{1/2}$, in which y is the value of the focal spot diameter $d_i$ and x is the value for the continuous index i and k and a are constants.

7. A computer program embodied in a non-transitory tangible media for implementation on a programmable computer for focusing a laser in the laser processing of a workpiece, the program including the following steps:
    (a) adjusting the focal distance f of a laser to a starting value A;
    (b) resetting a continuous index i to an initial value;
    (c) producing a focal spot on a workpiece to be processed;
    (d) storing the current value of the continuous index i together with the corresponding value of the focal distance $f_i$ and the corresponding value of the focal spot position $pos_i$;
    (e) moving the workpiece by one path increment $\Delta x$ along a predetermined track;
    (f) adjusting the focal distance f in the direction of a final value B by one infeed increment $\Delta f$;
    (g) incrementing the continuous index i and repeating the steps (c) to (f) until reaching one of
        (i) a previously determined number $i_{max}$ of focal spots;
        (ii) the final value B; and
        (iii) the end of the predetermined track;
    (h) determining the focal spot with the smallest focal spot diameter $d_{opt}$;
    (i) determining the optimal continuous index $i_{opt}$ belonging to the focal spot having smallest focal spot diameter $d_{opt}$; and
    (j) adjusting the focus of the laser to the optimal focal distance $f_{opt}$ belonging to the optimal continuous index $i_{opt}$;
    wherein the steps of determining the focal spot with the smallest focal spot diameter $d_{opt}$ and of determining the associated continuous index $i_{opt}$ comprise the following sub-steps
        (1) resetting the continuous index i to the initial value;
        (2) examining the particular value of the stored focal spot position $pos_i$;
        (3) determining and storing the particular focal spot diameter $d_i$ corresponding to the stored focal spot position $pos_i$;
        (4) incrementing the continuous index i and repeating the sub-steps (2) to (4) until reaching the previously determined number $i_{max}$ of focal spot positions $pos_i$;
        (5) determining an interpolating or approximating function that reproduces the focal spot diameter $d_i$ as a function of the continuous index i;
        (6) determining the minimum of the interpolating or approximating function;

(7) determining the continuous index $i_{opt}$ located closest to the minimum of the interpolating or approximating function.

8. An apparatus for automatic laser focusing for achieving the smallest possible focal spot during the laser processing of a workpiece, the apparatus comprising:
   a laser;
   a focusing device that adjusts the focus position of the laser;
   a tensioning device that tensions the workpiece;
   a moving device that changes the position of the workpiece with respect to the laser;
   a imaging device for photographing the image data of focal spots created by the laser;
   a storage and arithmetic unit for storing the photographed image data and its mathematical analysis; and
   a device for the data transmission of the analysis results to the focusing device for adjusting the focus position
   wherein
   (a) the focusing device adjusts the focal distance f of the laser to a starting value A;
   (b) the storage and arithmetic unit resets a continuous index i to an initial value;
   (c) the laser produces a focal spot on a workpiece to be processed;
   (d) the storage and arithmetic unit stores the current value of the continuous index i together with the corresponding value of the focal distance $f_i$ and the corresponding value of the focal spot position $pos_i$;
   (e) the moving device moves the workpiece by one path increment Δx along a predetermined track;
   (f) the focusing device adjusts the focal distance f in the direction of a final value B by one infeed increment Δf;
   (g) the storage and arithmetic unit increments the continuous index i and the steps (c) to (f) are repeated until reaching one of
      (i) a previously determined number $i_{max}$ of focal spots;
      (ii) the final value B; and
      (iii) the end of the predetermined track;
   (h) determining with the storage and arithmetic unit the focal spot with the smallest focal spot diameter $d_{opt}$;
   (i) determining with the storage and arithmetic unit the optimal continuous index $i_{opt}$ belonging to the focal spot having smallest focal spot diameter $d_{opt}$; and
   (j) adjusting with the focusing device the focus of the laser to the optimal focal distance $f_{opt}$ belonging to the optimal continuous index $i_{opt}$;
   wherein the storage and arithmetic unit determines the focal spot with the smallest focal spot diameter $d_{opt}$ and determines the associated continuous index i by
      (1) resetting the continuous index i to the initial value;
      (2) examining the particular value of the stored focal spot position $pos_i$;
      (3) determining and storing the particular focal spot diameter $d_i$ corresponding to the stored focal spot position $pos_i$;
      (4) incrementing the continuous index i and repeating the sub-steps (2) to (4) until reaching the previously determined number $i_{max}$ of focal spot positions $pos_i$;
      (5) determining an interpolating or approximating function that reproduces the focal spot diameter $d_i$ as a function of the continuous index i;
      (6) determining the minimum of the interpolating or approximating function;
      (7) determining the continuous index $i_{opt}$ located closest to the minimum of the interpolating or approximating function.

9. An apparatus in accordance with claim 8, wherein the imaging device is a CCD camera.

10. An apparatus in accordance with claim 8, wherein the focusing device can be automatically adjusted.

* * * * *